United States Patent
Brown et al.

(10) Patent No.: US 9,632,903 B2
(45) Date of Patent: Apr. 25, 2017

(54) TECHNIQUES FOR DISTRIBUTED TESTING

(71) Applicant: Novell, Inc., Provo, UT (US)

(72) Inventors: Jeremy Ray Brown, Bluffdale, UT (US); Lloyd Leon Burch, Payson, UT (US)

(73) Assignee: Micro Focus Software Inc., Wilmington, DE (US)

( * ) Notice: Subject to any disclaimer, the term of this patent is extended or adjusted under 35 U.S.C. 154(b) by 178 days.

(21) Appl. No.: 14/042,029

(22) Filed: Sep. 30, 2013

(65) Prior Publication Data

US 2014/0032174 A1     Jan. 30, 2014

Related U.S. Application Data

(63) Continuation of application No. 13/399,714, filed on Feb. 17, 2012, now Pat. No. 8,560,273, which is a continuation of application No. 12/342,564, filed on Dec. 23, 2008, now Pat. No. 8,145,450.

(51) Int. Cl.
    *G06F 11/30*      (2006.01)
    *G06F 11/34*      (2006.01)
    *G06F 11/36*      (2006.01)

(52) U.S. Cl.
CPC ...... *G06F 11/3433* (2013.01); *G06F 11/3664* (2013.01); *G06F 11/3688* (2013.01)

(58) Field of Classification Search
USPC ........ 702/182, 183, 186, 187; 709/223, 224, 709/226
See application file for complete search history.

(56) References Cited

U.S. PATENT DOCUMENTS

| | | |
|---|---|---|
| 5,546,541 A | 8/1996 | Drew et al. |
| 5,880,730 A | 3/1999 | Durand |
| 6,088,732 A | 7/2000 | Smith et al. |
| 6,151,688 A | 11/2000 | Wipfel et al. |
| 6,338,112 B1 | 1/2002 | Wipfel et al. |
| 6,353,898 B1 | 3/2002 | Wipfel et al. |
| 6,359,900 B1 | 3/2002 | Dinakar et al. |
| 6,442,706 B1 | 8/2002 | Wahl et al. |
| 6,523,065 B1 | 2/2003 | Combs et al. |
| 6,618,818 B1 | 9/2003 | Wahl et al. |
| 6,957,199 B1 | 10/2005 | Fisher |
| 7,043,225 B1 | 5/2006 | Patel et al. |
| 7,254,645 B2 | 8/2007 | Nishi |
| 7,308,376 B2 | 12/2007 | Lu et al. |

(Continued)

OTHER PUBLICATIONS

U.S. Appl. No. 10/927,553, Non Final Office Action Mailed Nov. 9, 2007, 12 pgs.

(Continued)

*Primary Examiner* — Aditya Bhat
(74) *Attorney, Agent, or Firm* — Schwegman Lundberg & Woessner, P.A.

(57) ABSTRACT

Techniques for distributed testing are provided. Resources are identified for performing tests over a network. The tests and policies are sent to the resources and a proxy. The proxy delivers data for the tests to the resources and enforces the policies during the tests. The proxy also gathers statistics and results from the resources, which are executing the tests, and the proxy reports the statistics and results to one or more third-party services for subsequent manipulation and analysis.

16 Claims, 4 Drawing Sheets

(56) References Cited

U.S. PATENT DOCUMENTS

| | | | |
|---|---|---|---|
| 7,353,439 B2 | 4/2008 | Lin | |
| 8,145,450 B2 | 3/2012 | Brown et al. | |
| 8,560,273 B2 | 10/2013 | Brown et al. | |
| 2002/0120744 A1 | 8/2002 | Chellis et al. | |
| 2003/0014510 A1* | 1/2003 | Avvari | G06F 9/5055 709/223 |
| 2003/0014521 A1 | 1/2003 | Elson et al. | |
| 2003/0081623 A1* | 5/2003 | Kiremidjian | H04L 47/10 370/412 |
| 2003/0226069 A1 | 12/2003 | Legatt | |
| 2005/0081028 A1 | 4/2005 | Thornton et al. | |
| 2005/0198370 A1* | 9/2005 | Miller | H04L 63/0428 709/238 |
| 2005/0240841 A1 | 10/2005 | Lin | |
| 2006/0059565 A1 | 3/2006 | Green et al. | |
| 2007/0022324 A1 | 1/2007 | Chang et al. | |
| 2008/0181123 A1* | 7/2008 | Huang | H04L 12/2697 370/252 |
| 2010/0161281 A1 | 6/2010 | Brown et al. | |
| 2012/0151066 A1 | 6/2012 | Brown et al. | |

OTHER PUBLICATIONS

U.S. Appl. No. 10/927,553, Response to Non Final Office Action mailed Nov. 9, 2007, 11 pgs.

U.S. Appl. No. 10/927,553, Final Office Action mailed Apr. 17, 2008, 14 pgs.

U.S. Appl. No. 10/927,553, Response filed Jun. 17, 2008 to Final Office Action mailed Mar. 17, 2008, 11 pgs.

U.S. Appl. No. 10/927,553, Advisory Action mailed Jun. 30, 2008, 4 pgs.

U.S. Appl. No. 10/927,553, Non Final Office Action mailed Aug. 28, 2008, 12 pgs.

U.S. Appl. No. 10/927,553, Response filed Nov. 26, 2008 to Non Final Office Action mailed Aug. 28, 2008, 12 pgs.

U.S. Appl. No. 12/342,564, Non Final Office Action mailed Oct. 12, 2011, 8 pgs.

U.S. Appl. No. 12/342,564 , Response filed Jan. 11, 2012 to Non Final Office Action mailed Oct. 12, 2011, 11 pgs.

U.S. Appl. No. 12/342,564, Notice of Allowance mailed Feb. 3, 2012, 8 pgs.

U.S. Appl. No. 13/399,714, Non Final Office Action mailed Jun. 8, 2012, 7 pgs.

U.S. Appl. No. 13/399,714, Response filed Sep. 10, 2012 to Non Final Office Action mailed Jun. 8, 2012, 9 pgs.

U.S. Appl. No. 13/399,714, Non-Final Office Action mailed Feb. 26, 2013, 9 pgs.

U.S. Appl. No. 13/399,714, Response filed May 28, 2013 to Non Final Office Action mailed Feb. 26, 2013, 6 pgs.

U.S. Appl. No. 13/399,714, Notice of Allowance mailed Jun. 14, 2013, 8 pgs.

"European Search Report", European Search Report for EP05107532, (Nov. 9, 2005), 12 pgs.

"HP LoadRunner software Data Sheet", https://h10078.www1.hp.com/cda/hpms/display/main/hpms_content.jsp?zn=bto&cp=1-11-126-17%5E8_4000_100_, (2008).

"IBM Rational Software Delivery Platform", http://www-01.ibm.com/software/info/developer/index.html, (Downloaded Dec. 11, 2008).

* cited by examiner

TECHNIQUES FOR DISTRIBUTED TESTING

RELATED APPLICATIONS

The present application is a continuation of, claims priority to, U.S. patent application Ser. No. 13/399,714, filed on Feb. 17, 2012, now issued as U.S. Pat. No. 8,560,273, which is a continuation of, and claims priority to, U.S. patent application Ser. No. 12/342,564, entitled: "Techniques for Distributed Testing," filed on Dec. 23, 2008, now issued as U.S. Pat. No. 8,145,450, all of which are incorporated herein by reference in their entireties.

BACKGROUND

Enterprises and individuals possess tremendous amounts of computing resources and often these resources are interconnected with one another over a network, such as the Internet. Resources may include storage devices, processing devices, memory devices, bandwidth devices, and the like. Many times a vast majority of these available resources are idle or under utilized. This has the potential of providing a tremendous opportunity to other network users whom at different times lack enough resources or have fully loaded resources which are not available to perform a desired task.

Unfortunately, enterprises and individuals are unwilling to share or sell access to their idle or under utilized resources. This is so, because resource owners fear misuse of their resources, fear exposure of confidential information contained within environments of their resources, and fear exposing their resources during the process to third-party intruders and/or to electronic viruses.

The concerns of resource owners are well-founded with existing network communications. That is, just a single misuse of an owner's resources can have catastrophic effects for an individual or an enterprise. Moreover, because the Internet is a chaotic environment with the identities of users often feigned and information transmitted over public communication lines, existing techniques cannot guarantee that misuse will not occur.

The scaling of different applications and servers can require as many as a 1000 machines in one lab trying to duplicate an environment and simulate a real world situation with many machines. Why dedicate people and resources when enterprises already have machines of their employees that can run the same test? However, the test in the lab is completely false, while a test from dispersed clients on a real network with real computers at least comes one step closer to a real world testing success.

In the future enterprises will need to test complex web sites, portals, or services and they do not have the machines or setup in order to run this type of test in the necessary size or the complexity required to make it realistic. Essentially, there is no way to build and execute complex tests that can allow an enterprise to use real machines with real networks to see how a system performs under load.

This is a major problem that every enterprise faces today and the industry lacks an approach to effectively predict what will really happen by testing with just internal deployments.

Thus, what is needed is a mechanism for improved distributed testing.

SUMMARY

In various embodiments, techniques for distributed testing are provided. More specifically, and in an embodiment, a method is provided for distributed testing. Policies are used to identify a set of resources for performing one or more tests. The resources are distributed over a network. A proxy is made available to the set of resources; the proxy delivers data to the one or more resources for use within the one or more tests. A proxy controls and monitors the one or more tests that the one or more resources execute. The results are captured from the one or more tests and the results and statistics for the one or more tests are provided to a third-party service that collects, reports, and manages the statistics.

DETAILED DESCRIPTION

Figure 1:
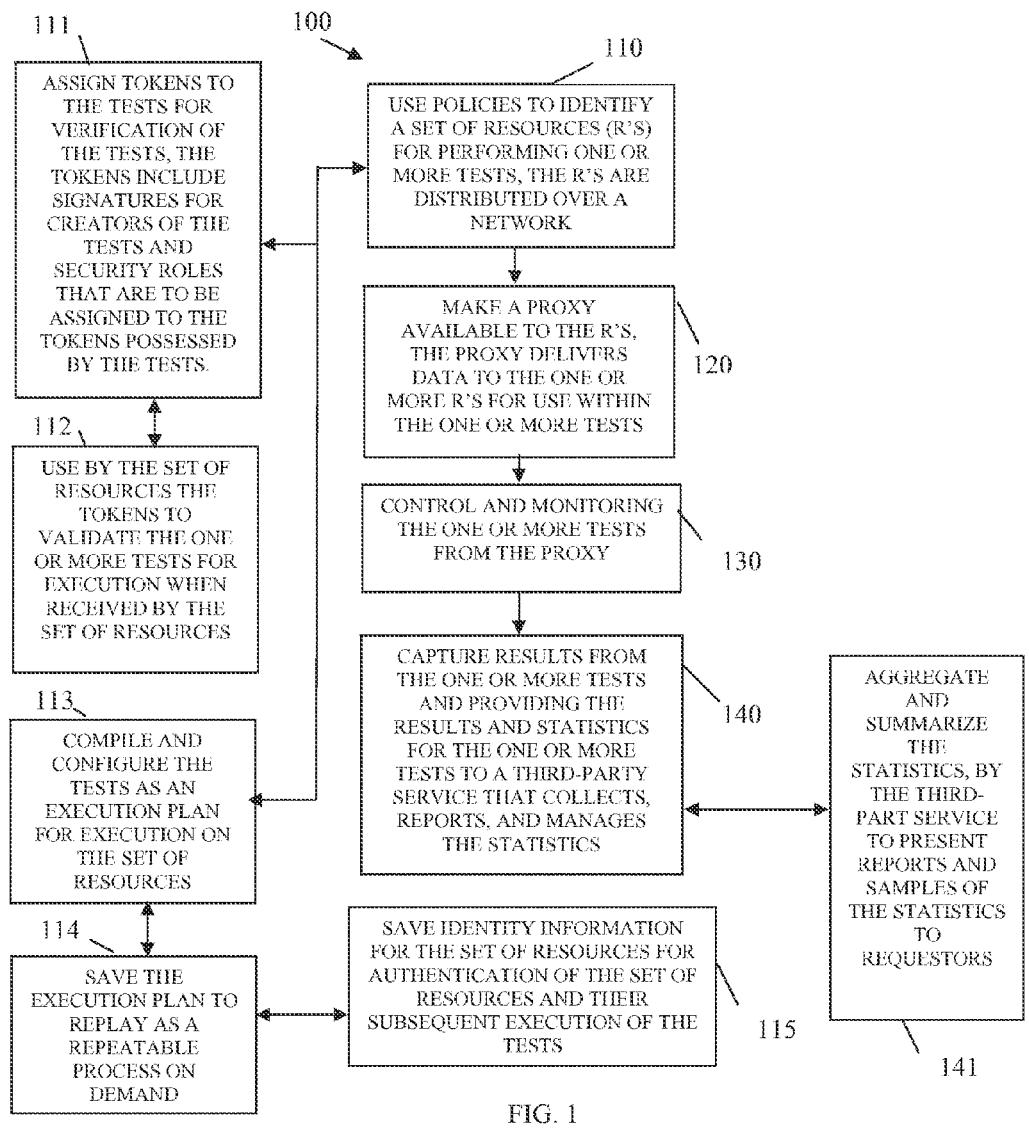
FIG. 1 is a diagram of a method for distributed testing, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "story" is a form of a distributed test and it includes a sequence of events or operations that are to be processed in a predefined order. Stories can be sent to machines (such as a client (a type of resource)) to execute a series of actions, operations, or commands defining a test for a processing environment of that machine.

"Policies" are statements or conditions regarding requestors, resources, and/or usage of resources. Policies may also restrict an amount of usage for a resource that a requestor can have. For example, maybe the processing desires to make only 10% of its available idle bandwidth available to the requestor. A policy may also dictate that the requested resource not be allocated unless a certain minimum level of service is capable of being provided from that resource to the requestor. A Policy may also restrict allocation of a requested resource to certain times of the day, calendar days, usage levels, processing (e.g., media streaming only, etc.), and the like. A wide-variety of policy controls may be associated with any particular received request, requestor, or resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment."

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity services may authenticate and establish trust with one another, viewing one another as a specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic identities;" filed on Oct. 28, 2005; and the disclosure of which is incorporated by reference herein.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for distributed testing, according to an example embodiment. The method 100 (hereinafter "distributed testing service") is implemented as instructions in a machine-accessible and computer-readable storage medium. The instructions when executed by a machine (computer, processor, etc.) perform the processing depicted in FIG. 1. The distributed testing service is also operational over and processes within a network. The network may be wired, wireless, or a combination of wired and wireless.

At 110, the distributed testing service uses policies to identify a set of resources for performing one or more tests. The resources are distributed over a network, such as a wide-area network (WAN) like the Internet. In some cases, the resources may be distributed over a local-area network (LAN) like and internal Intranet. The resources can be distributed over both a WAN and a LAN as well. The resources may be viewed as clients. In some cases, the clients can be virtual machines or virtual processing environments that exist on physical machines with other virtual machines or clients.

The techniques that are used to identify the clients for the tests that are to be executed on those clients can vary. In a particular case, the resources can be identified and used in accordance with techniques discussed and taught in U.S. patent Ser. No. 10/927,553 entitled: "Allocation of Network Resources," filed on Aug. 26, 2004, and commonly assigned to Novell Inc. of Provo, Utah. It is also noted that the entire resource need not be used as just a portion of the resource can be used for the testing.

So, a user may define characteristics for a test that includes a certain number of clients, with each client having different configurations, such as one running Linux® OS and one running MAC® OS. The distributed testing service can then use a variety of policies, characteristics, and techniques such as those discussed above to locate the clients (resources) that are to participate in the tests.

According to an embodiment, at 111, the distributed testing service assigns tokens to the tests for subsequent verification of the tests. These tokens can include digital signatures for the creators (testers, administrators, users, etc.) of the tests. The tokens can also include security roles that are to be assigned to the tokens possessed by the tests.

Continuing with the embodiment at 111 and at 112, the distributed testing service can ensure that the set of resources uses the tokens to validate the tests for execution on the resources when received by the resources. Again, the tokens provide a security mechanism so the resources can be assured that they are not being tricked into executing something that may be potentially harmful to their processing environments and network connections. So, all parties involved in the distributed testing procedures discussed herein have mechanisms to validate and trust one another for each transaction that takes place.

In another case, at 113, the distributed testing service compiles and configures tests as an execution plan for execution on the set of resources. Here, the distributed testing service may create the tests as stories or a series of events or operations that are to be processed in a predefined order and these stories are embodied in the execution plan Proper configuration settings are set in the execution plan as well to ensure proper execution of the tests on the resources.

Continuing with the embodiment at 113 and at 114, the distributed testing service saves the execution plan for purposes of allowing subsequent replaying of particular stories of interest to users or administrators. The replay mechanism ensures that the execution plan is a repeatable process that can be subsequently executed on demand by a user or administrator or even in response to a particular policy or event that dictates that the execution plan is to be replayed. This provides reuse when good and reliable tests are developed and known to exist within an enterprise.

Also continuing with the embodiment at 114 and at 115, the distributed testing service saves identity information for the set of resources for authentication of the set of resources and their subsequent execution of the tests. That is, the distributed testing service may interact with an identity service, such as the identity services discussed and incorporated by reference herein and above, for purposes of gathering identities for the resources (such as client machines, which can be virtual machines) and authentication mechanisms for those identities that permit the distributed testing service to validate the resources during each transaction with the resources. Again the testing is secure from the point of view of the resources as well as from the point of view of the distributed testing service.

At 120, the distributed testing service makes a proxy available to the resources. The proxy delivers data to the one or more resources for use within the one or more tests. So, if each resource is to receive a large chunk of test data to execute the tests, then that data can be distributed on an as-requested basis via the proxy. This ensures that network bandwidth is not adversely impacted during testing, which is typically what happens with conventional testing approaches. The proxy provides a number of beneficial features to the distributed testing service and to the resources, some of which are presented here with the discussion of the FIG. 1 and some of which are elaborated on in greater detail below with reference to the method 200 of the FIG. 2.

At 130, the distributed testing service configures the proxy or ensures that the proxy is configured to control and monitor the tests that the resources perform on behalf of the distributed testing service. That is, the proxy is not just a test data distributor but is also an active participant that monitors and controls the testing as the testing takes place on the resources.

At 140, the distributed testing service, via actions of the proxy, captures results from the one or more tests and provides the results and statistics for the tests to a third-party service. The third-party service is responsible for collecting the results and statistics for purposes of generating reports and managing the statistics about the tests. These actions are performed by the proxy on behalf of the distributed testing service. So, statistic collection or audit trail information about the tests is offloaded to the third-party service. This makes for more efficient processing since the server that processes the distributed testing service is free to do other things and relies on the third-party service and the proxy to handle management of and reporting about the tests back to the distributed testing service.

According to an embodiment, at 141, the distributed testing service receives an aggregation and summary of the statistics from the third-party service. This can be done via reports and samples of the statistics that are delivered to the distributed testing service from the third-party service when a requestor that interfaces with the distributed testing service makes a request or when policy dictates that such information is to be provided.

Figure 2:
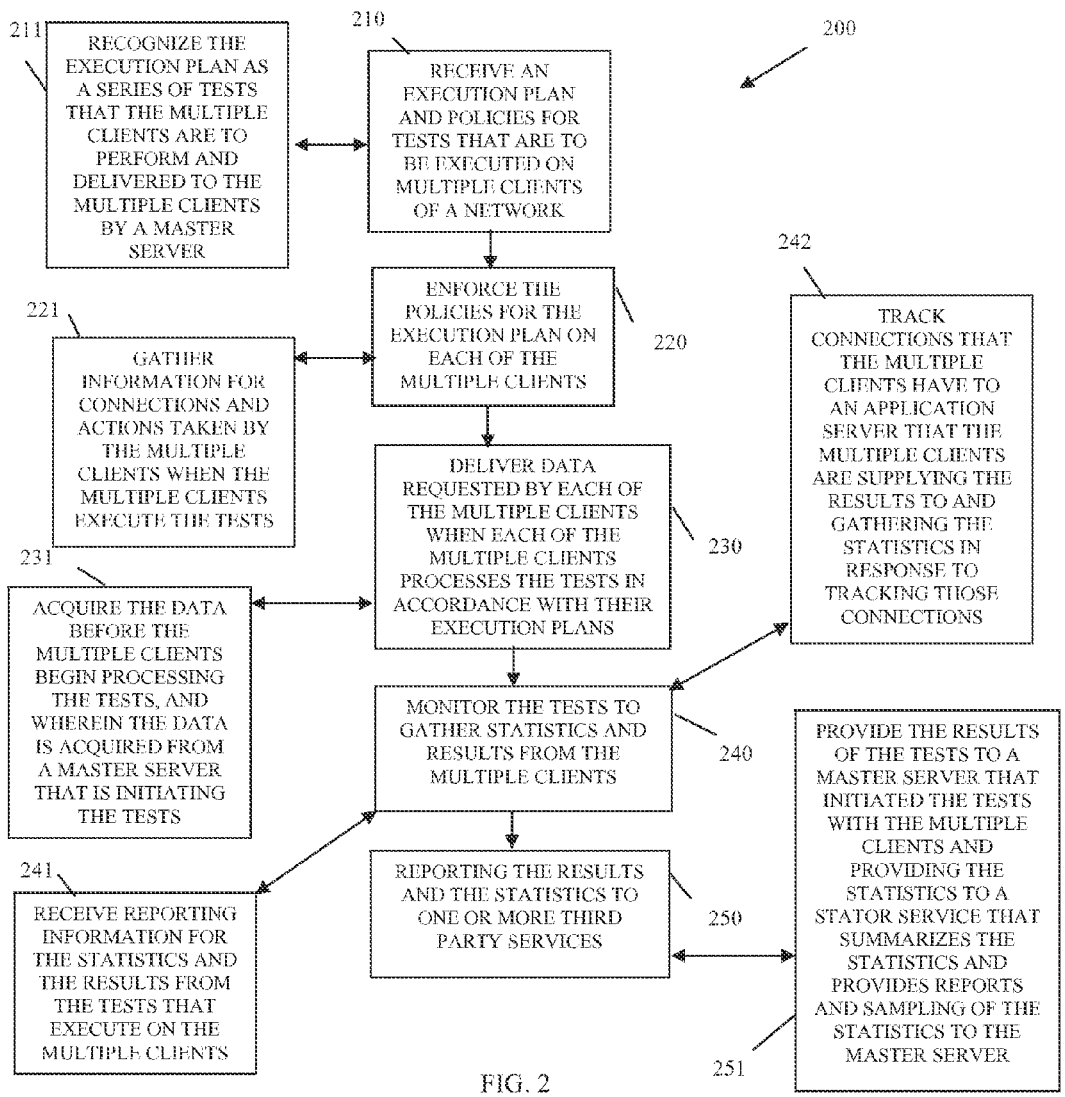
FIG. 2 is a diagram another method for distributed testing, according to an example embodiment.

FIG. 2 is a diagram another method 200 for distributed testing, according to an example embodiment. The method 200 (hereinafter "distributed tester") is implemented as instructions in a machine-accessible and computer-readable storage medium. The instructions when executed by a machine (computer, processor, etc.) perform the processing depicted in FIG. 2. The distributed tester is also operational over and processes within a network. The network may be wired, wireless, or a combination of wired and wireless.

The distributed tester presents another and in some ways enhanced perspective to the distributed testing service, which was discussed above with reference to the method 100 of the FIG. 1. That is, the method 100 presented a perspective from a master server that generates and distributes tests to resources of a network and utilizes a proxy and a third-party service to assist in managing and reporting on the tests. Conversely, the distributed tester is presented from the processing point-of-view of the proxy that the method 100 utilized.

At 210, the distributed tester receives an execution plan and policies for tests that are to be executed on multiple clients of a network. Here, the clients may be viewed as specific types of resources that were discussed more generically above with reference to the FIG. 1. It is noted that in some cases the clients may also be virtual machines or virtual clients of a network. The execution plan is received from a master server via the method 100 of the FIG. 1, which was discussed above.

According to an embodiment, at 211, the distributed tester recognizes the execution plan as a series of tests that the multiple clients are to perform and that are delivered to the multiple clients by a master server, such as via the processing discussed above with reference to the method 100 of the FIG. 1.

At 220, the distributed tester enforces the policies for the execution plan on each of the multiple clients. That is, security restrictions and processing limits or restrictions are enforced by the distributed tester.

In an embodiment, at 221, the distributed tester gathers information for network connections of the clients and gathers information for actions being taken by the multiple clients when the multiple clients execute the tests. This information can be a variety of metrics, such as memory usage, processing load, bandwidth utilization, page faults, time of execution, resources consulted, results produced, ports used, etc.

At 230, the distributed tester delivers data requested by each of the multiple clients when each of the multiple clients processes the tests in accordance with their execution plans. So, the distributed tester acts as a data distributor and holds data that is relevant to the tests. This centralized data distribution approach ensures that network bandwidth during the testing is not compromised and ensures that the clients receive just the data needed for the test when it is needed. Aspects of this feature were discussed above in detail with reference to the method 100 of the FIG. 1.

In an embodiment, at 231, the distributed tester acquires the data before the multiple clients even begin processing the tests. The data is acquired from a master server that initiates the tests, such as was discussed above with reference to the method 100 of the FIG. 1.

At 240, the distributed tester monitors the tests to gather statistics and results from the multiple clients. This can be done via reporting mechanisms embedded in the tests of the execution plan or can be done by the distributed tester monitoring network port connections that each of the clients use. This can also be done via a combination of embedded reporting services and port monitoring approaches.

According to an embodiment, at 241, the distributed tester receives reporting information for the statistics and the results from the tests that execute on the multiple clients. Again, this is a situation where the tests themselves are designed to report to the distributed tester during their execution so the distributed tester can monitor and control the testing and the execution plan more efficiently.

In another case, at 242, the distributed tester tracks network port connections that the multiple clients have to an application server. The multiple clients are interacting during the tests with the application server over the network, so the distributed tester can monitor that connection to acquire and gather the information or metrics about the tests. The usage of the connections can provide statistical metrics about performance and inspection of the packet payloads can reveal actual results from the tests that the clients perform. So, statistics (metrics) for the connections can be automatically acquired by the distributed tester by watching the clients interact with the application server during the tests over the proper port connections of the network.

At 250, the distributed tester reports the results and the statistics to one or more third-party services. That is, the master server may or may not request the results directly and the results along with the statistics can be sent to a specialized server (stator server) that processes the results and/or statistics on behalf of the master server.

In an embodiment, at 251, the distributed tester also provides the results of the tests to a master server that initiated the tests with the multiple clients. The statistics are supplied to a stator service that then summarizes the statistics and provides reports and sampling of the statistics to the master server on demand or on predefined configuration settings, policies, and/or events.

Figure 3:
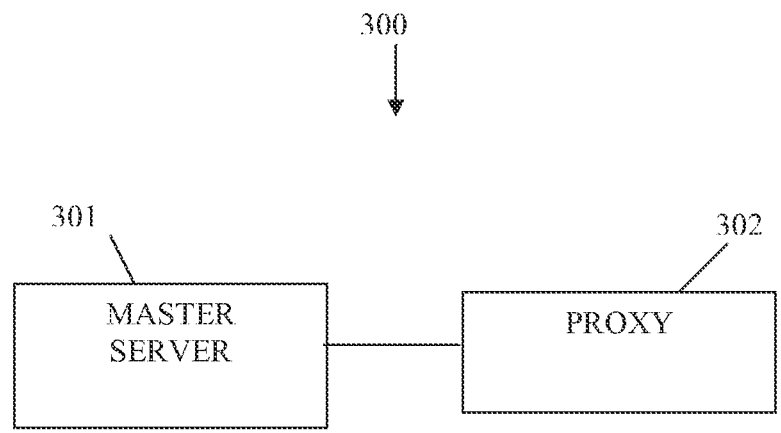
FIG. 3 is a diagram of a distributed testing system, according to an example embodiment.

FIG. 3 is a diagram of a distributed testing system 300, according to an example embodiment. The distributed testing system 300 is implemented as instructions (within a machine-accessible and computer-readable storage medium) that when executed by a machine (processor, etc.) perform, among other things, the processing discussed above with respect to the methods 100 and 200 of the FIGS. 1 and 2, respectively. Moreover, the distributed testing system 300 is operational over a network, and the network may be wired, wireless, or a combination of wired and wireless.

The distributed testing system 300 includes a master server 301 and a proxy 302. Each of these components of the system 300 and their interactions with one another will now be discussed in detail.

The master server 301 is implemented in a computer-readable storage medium and processes over a network on a first server. Example processing aspects associated with the master server 301 were presented in detail above with reference to the method 100 of the FIG. 1.

The master server 301 identifies clients (type of resource) to perform tests. The master server 301 also communicates the tests and policies for running the tests to the clients and the proxy 302.

According to an embodiment, the master server 301 includes a user interface that permits a user (another type of resource) to define characteristics for desired clients that the master server 302 then uses to locate the clients for the tests.

In an embodiment, the master server 301 organizes the tests as an execution plan that is saved and capable of being replayed on demand with one or more of the clients. This was discussed in detail above with reference to the method 200 of the FIG. 2.

In still another embodiment, the master server 301 provides authentication tokens with the tests that the clients can use to authenticate the tests for execution on the clients. The authentication tokens can also include security roles that are to be enforced by the clients when running the tests. This was discussed in detail above with reference to the method 100 of the FIG. 1.

The proxy 302 is implemented in a computer-readable storage medium and processes over the network on a second server that is different from and separated from the first sever that processes the master server 301. Example processing details associated with the proxy 301 were presented in detail above with reference to the method 200 of the FIG. 2.

The proxy 302 enforces the policies during the tests and monitors the clients during the tests to gather statistics and results that are then reported back (directly or indirectly via a third-party service) to the master server 301. Details associated with this were presented above with reference to the method 200 of the FIG. 2.

According to an embodiment, the proxy 302 monitors network connections that the clients make to an application server. The clients communicate with the application server in response to processing the tests to deliver results and the statistics and/or audit log information is independently acquired as metrics via the connection that the clients make to the application server.

In a particular case, the proxy 302 supplies the statistics to a third-party stator service or server that compiles and aggregates the statistics. That stator service reports a sampling of the statistics back to the master server when requested to do so or based on prior configuration.

Figure 4:
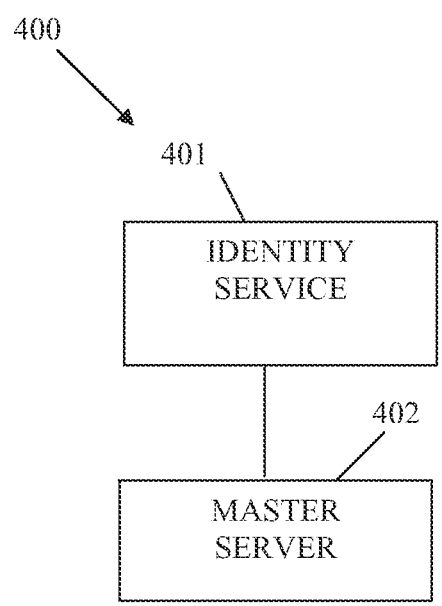
FIG. 4 is a diagram of another distributed testing system, according to an example embodiment.

FIG. 4 is a diagram of another distributed testing system 400, according to an example embodiment. The distributed testing system 400 is implemented as instructions on or within a machine-accessible and computer readable storage medium. The instructions when executed by a machine (processor, computer, etc.) perform processing depicted with respect to the methods 100 and 200 of the FIGS. 1-2, respectively. The distributed testing system 400 is also operational over a network and the network may be wired, wireless, or a combination of wired and wireless.

The distributed testing system 400 presents a different perspective and in some cases enhanced perspective of the distributed testing system 300 discussed above with reference to the FIG. 3.

The distributed testing system 400 includes and identity service 401 and a master server 402. Each of these and their interactions with one another will now be discussed in detail.

The identity service 401 is implemented in a computer-readable storage medium and processed by a processor of a network. Example identity services that can be modified to achieve the enhanced processing discussed herein were described above and incorporated by reference herein and above.

The identity service 401 validates clients for running tests that are defined in execution plans by the master server 402. The identity service 401 can also supply authentication services to each of the clients that are running the tests to validate the tests before the clients execute the tests.

The master server 402 is implemented in a computer-readable storage medium and is processed by another and different processor of the network from that which was used by the identity service 401. Example processing associated with the master server 402 was presented in detail above with reference to the methods 100 and 200 of the FIGS. 1 and 2, respectively, and with respect to the system 300 of the FIG. 3.

During operation of the system 400, the master server 402 identifies the clients to run the tests and embodies the tests as stories (sequence of events or operations to process) within execution plans. A user interface to the master server 402 can supply characteristics for which the master server 402 uses to identify the clients. The user interface can also be used to define the tests or stories that are to be executed on the clients via the execution plan.

The clients acquire needed test data for running the tests from a proxy, such as the proxy described above with reference to the method 200 of the FIG. 2, and the proxy 302 of the system 300 of the FIG. 3. The proxy also monitors the tests that the clients execute to gather statistics and results that are then reported to a stator service. The stator service summarizes and samples the statistics and reports them (the sampling of the statistics) back to the master server 402.

According to an embodiment, the master server 402 uses the identity service to acquire authentication tokens that accompany the tests, which are sent to the clients. The authentication tokens are verified by the clients via interactions with the identity service 401. In some cases, the authentication tokens also include security roles that the clients are to enforce when executing the tests.

In some cases, some of the clients interact with the proxy and others of the clients interact with another and different proxy of the network. The different proxy performs the same features for the clients that use the different proxy as those services that the proxy performs for the clients that it services. In other words, the network can include multiple different proxies so as to not overload any single proxy. Moreover, redundant proxies can be used for failover support.

Figure 5:
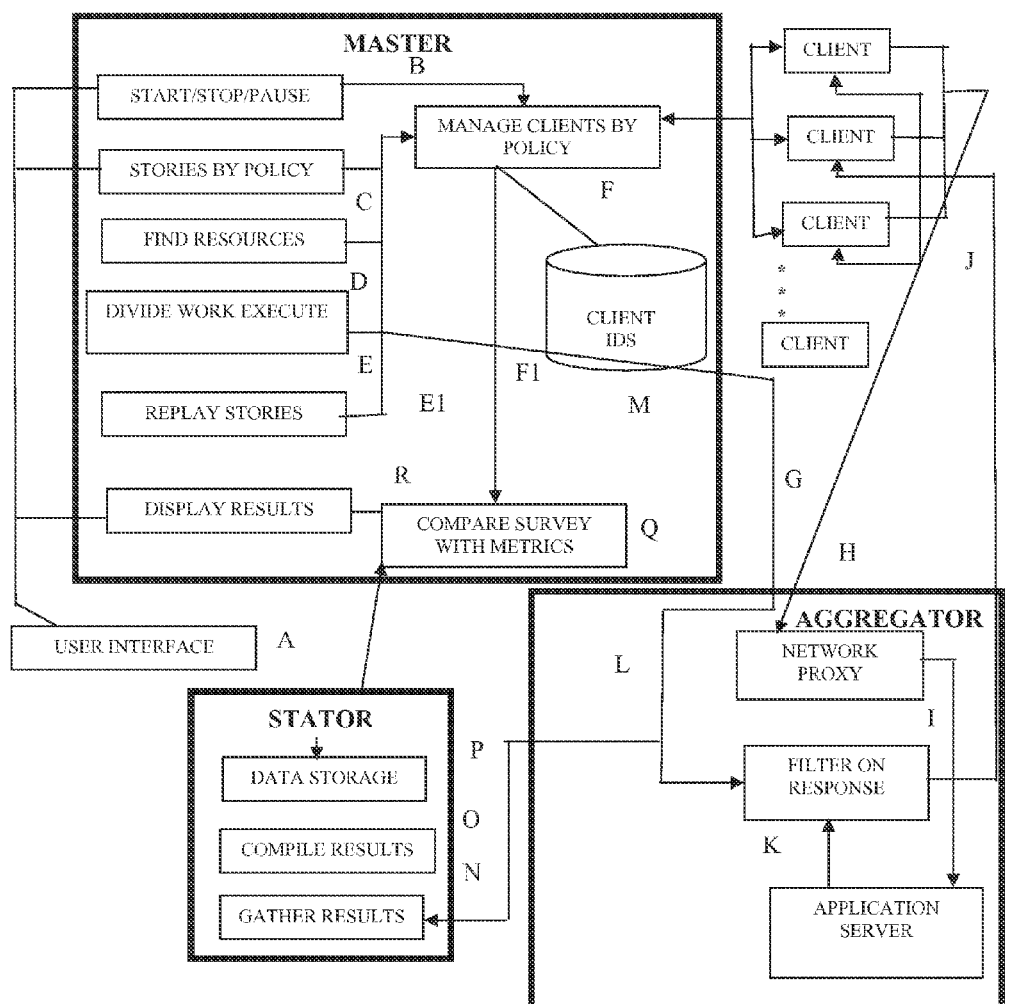
FIG. 5 is an example architecture for distributed testing that can utilize the techniques presented herein, according to an example embodiment.

FIG. 5 is an example architecture for distributed testing that can utilize the techniques presented herein, according to an example embodiment. Components of the architecture are implemented in a computer-readable storage medium as instructions that are executed by one or more processors of a network. The network may be wired, wireless, or a combination of wired and wireless.

It is noted that the architecture is presented for purposes of illustration only and other implementations and approaches are foreseeable without departing from the beneficial and novel teachings discussed herein.

No existing master/client products for testing use an aggregator or single point to capture the results. Also, no solutions or prior art allow one to separate out the compiling of statistics so that one can share a workload in a way that does not prohibit the size of the test/application. There are many solutions for clients as prior art but the techniques herein are taking a different approach by working with real machines instead of labs to run the environment. Then the techniques provide an Application Programming Interface (API) based upon policy as a broader solution for anything that can travel over a network to actually run as the client. This can work for very complex applications that may not be able to be integrated into current products/prior art and it does not care about any particular operating system (OS).

The invention is a solution to test or exercise an application or server over a network protocol that can allow one the flexibility to deliver a story (sequence of predefined events for a test) based upon a policy. The story interacts with any programmable solution for an application and allows great flexibility. The invention does allow one to run integration, performance, scalability, functionality, interoperability tests and also expand to look at production setups in a live network. Or, if one would just like to see how the system responds to a certain situation then it can be done with a story and the clients. The techniques can also be configured so that an entire test response can gauge exactly what the client is seeing on every transaction.

The architecture of FIG. 5 is composed of 4 components. The master is where an entire product (distributed tester) is controlled and statistics are displayed for the user. The client is where the code based upon policy is executed and then reports if the transaction was successful. The Aggregator is a proxy that allows all the traffic to travel through the product and also capture the traffic on the response from the server/application. The Stator performs gathering and compiling of the statistics for the test. There is no stopping this from running on one box but it is designed so one can have series for each component that depends on the needs of the user. So, one can have one master with 1000 clients, 10 aggregators and 10 stators to help run the system so one can gather valid results. The configuration is available for the user and at their discretion on how they use that system.

The first step A is the user interface and this is how the user interacts with the system. It can be implemented a number of different ways but it provides a real time view in the Master server to see what is dynamically happening in real time or near real time.

The next step B is where clients are controlled in stop, start and pause from an administrator. It runs independently from the actual stories so one can stop the tests regardless of the stories being run. This is an interaction that allows the interface to have exact control individually or as a collective setup.

The step C is where the system build stories based upon policies for the clients. The stories contain a sequence of what is happening on the client and this can be one long story or a simple story that is replayed multiple times. But, it allows the flexibility that one cannot find in current products or prior art to run a test that mimics a typical day for a company. These stories can include a token that is signed and contains roles assigned by the creator.

The step D is where the policies interact with the resources to match up the stories with the clients or report that one does not have the sufficient clients or resources to complete the task. The policies are key components, since policies are running to expand what can be done by the client. One example can be for the a policy to let one choose the OS of Macintosh, the timeline to run the test with cycles of every minute for the first hour then every ten minutes the next hour. The policies expand the options that can be taken with the client in combination with the story providing the most flexibility for any requirement.

The step E is where one compiles how the stories are to be run on the client by using the resources. This is done by primarily dividing the work and building a execution plan to be run on the system.

The step E1 is where techniques are used to save the execution plan to replay the same story so one has a repeatable process. This is especially critical for a system, because most prior techniques just attempt to play something general when one can really hit the system with a specific method to replay the story using the techniques presented herein.

The step F is the single point of access to the clients that help control and manage the clients from the administration.

The step F1 is the location where one stores the client ID's and connection information for each client. The information has to be stored in order to work the clients and it helps to manage what is being done and being performed.

The step G has the clients that run the applications for the system. The execution is controlled from the policies and they point at the network proxy which is part of the Aggregator. The client can validate the token that is sent with the application, if it is not valid or the application has been modified it is rejected. Next the "roles" in the token are checked to see if the required role is included.

The step H is where the network proxy is running and this allows the system to run through this point and have a mechanism to track connections. The tracking of connections makes it possible to see the information being sent to the Application/Server in step I and step K. Then in step J one can actually filter based upon the connection coming through because one needs to know what data should be rewritten.

The step L is where the information is received for the test to the stator which is where the status/statistics are compiled.

The step M is where the execution plan is communicated to the filter on a response to customize what should be received. This is the main communication channel with the proxy since the incoming connection is irrelevant but want control over the outgoing communication is relevant.

The step N is where the basic data is captured for the aggregator and transferred to the stator in this case. The step O is where the results are compiled and step P is where the data is stored for the entire process. One piece is that the data storage can also be scaled and distributed with multiple stators without having the master being the bottleneck in the process.

The step Q is where sampling/live data is compared with the results gathered from the aggregator to provide a graph/ statistics of what is happening for the techniques presented herein. The final step R shows the results of the system that helps to communicate the status of the clients and the success of the transactions.

The components of the FIG. 5 and the techniques present a variety of novel benefits for example: (1) the aggregator allows the solution to test with less overhead and a single point to gather stats rather then trying to gather from 1000 different machines that might be correct; (2) the aggregator also allows one to test with the ability to mask test sites that one does not want to be public until they are ready, so one can test at night on the same system that is being used during the middle of the day; (3) the stator allows one to separate out the intense statistics compiling and even report generation to a separate machine, this provides more flexibility with a modular architecture; (4) the ability to say one can run anything through the client API to not define customers application of the solution but rather dictate they can test the un-testable and scale the un-scalable; (5) the ability to do stories or basic settings allows customer to run exactly what they need to emulate an environment as closely as possible; (6) the ability to replay based upon real actions in the stories so if one had a problem one can get back to exactly where one needs to be with a simple buffer based on the user's requirements; (7) the ability to validate commands by tokens; and (8) the ability to validate roles by policy.

The above description is illustrative, and not restrictive. Many other embodiments will be apparent to those of skill in the art upon reviewing the above description. The scope of embodiments should therefore be determined with reference to the appended claims, along with the fill scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method residing as executable instructions in a non-transitory computer-readable storage medium and executed by a machine to perform the method, comprising:
   configuring, by the machine, a specific test of a plurality of tests for each resource of a plurality of resources to execute with the test data when received in a particular processing environment of that resource;
   distributing, by the machine, test data and the tests to resources over a network, each resource associated with a different processing environment and wherein distributing further includes distributing, by the machine, the tests and the test data on an as-requested basis to each of the resources;
   ensuring that network bandwidth is not adversely impacted on a network during the distributing of the tests and test data;
   collecting, by the machine, test results associated with the test data in response to each resource executing that resource's specific test and test data, and wherein collecting further includes participating, by the machine, in each of the specific tests with the machine being active participant in the specific tests;
   creating a sequence of what is occurring within the processing environments based on the tests, test data, and test results; and
   replaying the sequence on the machine for identifying and resolving problems within the processing environments.

2. The method of claim 1 further comprising, delivering, from the machine the test results to a third-party service over the network.

3. The method of claim 1 further comprising, participating, by the machine, in some tests associated with the test data to produce some of the test results.

4. The method of claim 1, wherein distributing further includes identifying the resources by evaluating a policy.

5. The method of claim 4, wherein identifying further includes deriving the policy based on characteristics defined for processing environments that include the resources.

6. The method of claim 4, wherein identifying further includes recognizing at least one resource as a virtual machine.

7. The method of claim 1, wherein configuring further includes configuring each specific test as a specific sequence of operations executed as commands by each of the resources.

8. The method of claim 1, wherein collecting further includes generating a report based on the test results.

9. A method residing on a non-transitory computer-readable storage medium and executed by a machine to perform the method, comprising:

delivering, by the machine, a first test configured for a first device having a first processing environment over a network and configuring a second test configured for a second device having a second processing environment, the first and second processing environments are disparate from one another;

distributing, by the machine, the first test and the second test on an as-requested basis to the first processing environment and the second processing environment;

ensuring network bandwidth is not adversely impacted on a network during the distributing;

managing, by the machine, executions of the first and second tests when processed by the first and second devices over the network, and wherein managing further includes participating, by the machine, in the first and second tests with the machine being an active participant in the first and second tests; and creating a sequence of what is occurring within the first and second processing environments based on the first and second tests and test results produced from the first and second tests within the first and second processing environments; and replaying the sequence on the machine for identifying and resolving problems within the first and second processing environments.

10. The method of claim 9 further comprising, controlling, by the machine, the executions of the first and second tests.

11. The method of claim 9 further comprising, participating, by the machine in the first test while processed on the first device.

12. The method of claim 9, wherein delivering further includes configuring the first test based on the first processing environment and configuring the second test based on the second processing environment.

13. The method of claim 12, wherein configuring further includes initially identifying the first and second devices and the first and second processing environmen s based on evaluation of one or more policies.

14. The method of claim 9, wherein managing further includes collecting first test results from execution of the first test and second test results from execution of the second test.

15. The method of claim 14, wherein collecting further includes reporting on combined results for the first test results and the second test results.

16. The method of claim 14, wherein collecting further includes forwarding the first test results and the second test results to a third-party service for evaluation.

\* \* \* \* \*

UNITED STATES PATENT AND TRADEMARK OFFICE
CERTIFICATE OF CORRECTION

PATENT NO. : 9,632,903 B2
APPLICATION NO. : 14/042029
DATED : April 25, 2017
INVENTOR(S) : Brown et al.

Page 1 of 1

It is certified that error appears in the above-identified patent and that said Letters Patent is hereby corrected as shown below:

In the Claims

In Column 14, Line 17, in Claim 13, delete "environmen s" and insert --environments-- therefor Signed and Sealed this
Fourth Day of June, 2019

Andrei Iancu
*Director of the United States Patent and Trademark Office*